United States Patent
Kawano

(10) Patent No.: US 12,139,409 B2
(45) Date of Patent: Nov. 12, 2024

(54) METHOD FOR MANUFACTURING HIGH-DENSITY ARTIFICIAL GRAPHITE ELECTRODE

(71) Applicant: NIPPON STEEL CHEMICAL & MATERIAL CO., LTD., Tokyo (JP)

(72) Inventor: Yoichi Kawano, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 492 days.

(21) Appl. No.: 17/439,984

(22) PCT Filed: Mar. 27, 2020

(86) PCT No.: PCT/JP2020/014151
§ 371 (c)(1),
(2) Date: Sep. 16, 2021

(87) PCT Pub. No.: WO2020/203825
PCT Pub. Date: Oct. 8, 2020

(65) Prior Publication Data
US 2022/0169515 A1  Jun. 2, 2022

(30) Foreign Application Priority Data
Mar. 29, 2019 (JP) .................. 2019-066900

(51) Int. Cl.
*C01B 32/205* (2017.01)
(52) U.S. Cl.
CPC ........ *C01B 32/205* (2017.08); *C01P 2006/40* (2013.01)
(58) Field of Classification Search
CPC ..... C01B 32/205; C01B 32/05; C04B 35/532; C04B 35/6261; C04B 35/62695; C04B 2235/5436; C04B 2235/6021; C04B 2235/608; C04B 2235/77
See application file for complete search history.

(56) References Cited

U.S. PATENT DOCUMENTS

| | | | | |
|---|---|---|---|---|
| 3,676,535 A | * | 7/1972 | Juel | C04B 35/532 |
| | | | | 264/108 |
| 4,604,184 A | * | 8/1986 | Cukier | C10C 1/18 |
| | | | | 208/45 |
| 7,959,888 B2 | * | 6/2011 | Oyama | C01B 32/05 |
| | | | | 208/131 |
| 9,777,221 B2 | * | 10/2017 | Miller | C04B 35/522 |

FOREIGN PATENT DOCUMENTS

| | | | | |
|---|---|---|---|---|
| CN | 104085883 A | | 10/2014 | |
| CN | 105958072 A | | 9/2016 | |
| CN | 108328613 A | * | 7/2018 | ........... C01B 32/205 |
| JP | 2011-522104 A | | 7/2011 | |
| JP | 2014-197496 A | | 10/2014 | |
| JP | 2015038840 A | * | 2/2015 | |
| WO | 2017/159769 A1 | | 9/2017 | |

OTHER PUBLICATIONS

CN108328613A-Machine Translation (Year: 2018).*
Particle Technology Labs, "Particle Shape Factors and Their Use in Image Analysis", Jun. 2011 (Year: 2011).*
JP 2015038840A—Machine Translation (Year: 2015).*
English Translation of International Preliminary Report on Patentability dated Apr. 12, 2021, issued for PCT/ JP2020/014151.

* cited by examiner

*Primary Examiner* — Yunju Kim
(74) *Attorney, Agent, or Firm* — Locke Lord LLP; James E. Armstrong, IV; Nicholas J. DiCeglie, Jr.

(57) ABSTRACT

Provided is a method for manufacturing a high-density artificial graphite electrode without substantially changing a particle size or a proportion of needle coke used, increasing an amount of binder pitch, or performing extrusion molding at a high molding pressure. The method for manufacturing a high-density artificial graphite electrode is kneading binder pitch into needle coke, performing extrusion molding thereof, and then calcining and graphitizing thereof, wherein needle coke obtained by performing coke shape changing treatment for at least some of pulverized needle coke to be used, thereby increasing a ratio of an enveloping perimeter/a perimeter by 1% or more as compared with a value before the changing is used. Here, the enveloping perimeter is a length of a perimeter when apexes of convex portions of the pulverized needle coke are connected to each other via the shortest distance, and the perimeter is a length of a perimeter of a particle.

4 Claims, No Drawings

METHOD FOR MANUFACTURING HIGH-DENSITY ARTIFICIAL GRAPHITE ELECTRODE

TECHNICAL FIELD

The present invention relates to a method for manufacturing a high-density artificial graphite electrode, and particularly to a method for manufacturing an electrode for high-density electric steelmaking used at the time of manufacturing electric furnace steel by electric steelmaking.

BACKGROUND ART

An artificial graphite electrode is made of coal-based or petroleum-based needle coke serving as an aggregate, formed by hardening this with binder pitch serving as a binding material, and widely used as an electrode for electric steelmaking. Such an artificial graphite electrode is usually manufactured by sieving needle coke and further pulverizing and preparing it to have a predetermined particle size, then kneading it with binder pitch, subsequently performing extrusion molding thereof, and then calcining and graphitizing thereof.

In recent years, with the spread of large-scale high-load electric furnaces, a DC current furnace and an AC electric furnace with an artificial graphite electrode having a diameter of 24 to 32 inches have become the mainstream. When a size of an artificial graphite electrode increases, a difference in temperature in a radial direction thereof during use of the electrode increases, and thus cracks due to thermal shock are easily generated. One of causes of the cracks is considered to be a tissue structure inside the electrode, in particular a form of voids, or the like.

PTL 1 discloses cutting a sample out from an artificial graphite electrode, calculating a parameter called a shape coefficient from perimeters and areas of voids created between aggregates from image analysis of a cross-section thereof, and a relationship between a state of voids and an artificial graphite electrode in which cracks are less likely to be generated.

In a method for manufacturing an artificial graphite electrode, the final quality of the artificial graphite electrode is determined by the quality of a molded product immediately after kneading needle coke and binder pitch and performing extrusion molding of it. Further, a density of a central portion of the artificial graphite electrode tends to be lower than that of an outer circumferential portion thereof, and the tendency is particularly strong when a diameter thereof increases. For that reason, in many cases, needle coke is pulverized and then classified, and needle coke having various particle sizes are selected and used in a desired blending amount in order to lessen voids formed between aggregates.

NPL 1 discloses that there is a close relationship between a filling density of aggregates and a density of a molded product, and in order to increase the density, aggregates each having a high density are used and adjusted to have various particle size distributions to increase the filling density. Needle coke used in this case is a combination of 20 to 40 mesh (0.8 to 0.4 mm) grains, 20 to 150 mesh (0.8 to 0.1 mm) powder, and 10 μm or less fine powder, or carbon black is used instead of the 10 μm or less fine powder.

CITATION LIST

Patent Literature

[PTL 1] Japanese Patent Application Laid-open No. 2002-246171

Non Patent Literature

[NPL 1] Tanso (Carbon), 1977, No. 91 pp. 138-144

SUMMARY OF INVENTION

As described above, in the conventional technique, for the purpose of preventing cracks due to thermal shock to the artificial graphite electrode resulting from increase in diameter, in order to lessen the voids created between the aggregates in the method for manufacturing the artificial graphite electrode, the needle coke is pulverized, sorted by classification according to particle size, and then the needle coke having a plurality of particle sizes is combined and kneaded with the binder pitch. This is carried out from the idea of filling gaps by combining various particle sizes in order to increase the filling density.

However, a crystal structure of needle coke develops into a needle shape, and when the needle coke is pulverized, it becomes an elongated shape and fine irregularities derived from the crystal structure are generated. For that reason, even if pulverized products having a plurality of particle sizes are combined in order to increase a filling density of needle coke serving an aggregate, voids generated and derived from a form thereof remain.

Thus, an object of the present invention is to provide a manufacturing method of a high-density artificial graphite electrode using a method different from the conventional method. That is, an object of the present invention is to provide a manufacturing method in which a high-density artificial graphite electrode can be obtained without significantly changing a particle size or a proportion of needle coke used, increasing an amount of binder pitch, or performing extrusion molding at a high molding pressure, unlike that disclosed in the conventional technique.

Solution to Problem

As a result of intensive research to solve the above problems, the present inventors have found that the above-mentioned problems can be solved by additionally treating some or all of pulverized needle coke used as an aggregate and using the needle coke, which has been changed to a specific shape, as the needle coke serving as an aggregate, and have completed the present invention.

That is, the present invention is a manufacturing method of an artificial graphite electrode of pulverizing needle coke, kneading the pulverized needle coke with binder pitch, extrusion molding thereof, and then calcining and graphitizing thereof, and is a manufacturing method of a high-density artificial graphite electrode, which is characterized by pulverizing needle coke, and then performing coke shape changing treatment for some or all of pulverized needle coke, thereby increasing a ratio of an enveloping perimeter/a perimeter ($E_A/L_A$) of the needle coke after the shape changing treatment by 1% or more as compared with a value ($E_0/L_0$) before the shape changing treatment as a reference.

Here, the enveloping perimeter is a length of a perimeter when apexes of convex portions of a particle of needle coke are connected to each other via the shortest distance, and the perimeter is a length of a perimeter of the particle.

The enveloping perimeter and the perimeter of the particles are measured by an image analyzer.

In the above manufacturing method, the needle coke preferably has a true specific gravity of 2.00 or more, a CTE of $1.30 \times 10^{-6}/°$ C. or less, a nitrogen content of 0.6 wt % or less, and a sulfur content of 0.6 wt % or less.

In this case, the CTE was calculated by making a standard test piece and measuring an average thermal expansion coefficient from room temperature to 500° C. The nitrogen content was measured in accordance with JIS M 8819. The sulfur content was measured in accordance with JIS M 8813.

In the above manufacturing method, the needle coke for which the shape changing treatment is performed is preferably pulverized needle coke having a particle size of 500 μm or less.

In the above manufacturing method, the binder pitch preferably has a softening point of 70° C. to 150° C. and an amount of β resin of 15 to 30 wt %.

In this case, the amount of β resin is measured using a solvent analysis method of JIS K 2425 and is indicated by a difference between a toluene insoluble component and a quinoline soluble component.

According to the present invention, it is possible to manufacture a high-density artificial graphite electrode without significantly changing a particle size or a proportion of needle coke used, increasing an amount of binder pitch, or performing extrusion molding at a high molding pressure. Accordingly, the present invention can be sufficiently applied to manufacturing of a large artificial graphite electrode (for example, 24 to 32 inches in diameter) corresponding to a large high-load electric furnace.

Further, the present invention makes it possible to produce a high-density artificial graphite electrode by lowering a pressure in an extrusion molding process as compared with a conventional condition even in a case in which amounts of and a ratio between the needle coke and the binder pitch are not changed, and can also contribute to a great deal of energy saving.

DESCRIPTION OF EMBODIMENTS

A manufacturing method of the present invention is characterized by using needle coke obtained by performing coke shape changing treatment for some or all of pulverized needle coke product kneaded with binder pitch, thereby increasing a ratio of an enveloping perimeter/a perimeter $(E_A/L_A)$ of the needle coke after the shape changing treatment by 1% or more as compared with a value $(E_0/L_0)$ before the shape changing treatment as a reference.

In this case, although the pulverized needle coke whose shape is changed may be the whole thereof, only some of the pulverized needle coke may be subjected to the changing treatment. 1 wt % or more, preferably 5 wt % or more, more preferably 20 wt % or more of the pulverized needle coke may be subjected to the changing treatment. A particle size of the pulverized needle coke to be subjected to the shape changing treatment is not particularly limited, but fine particles are more effective, and for example, it is preferable to perform the changing treatment to pulverized needle coke having a particle size of 500 μm or less, 130 μm or less, and more preferably 75 μm or less is preferable.

The method for performing the coke shape changing treatment, thereby increasing the ratio of the enveloping perimeter/the perimeter $(E_A/L_A)$ of the pulverized needle coke after the shape changing treatment by 1% or more as compared with the value $(E_0/L_0)$ before the shape changing treatment as a reference will be described.

Bulk needle coke is pulverized into fine particles by a crusher, for example, a jaw crusher, a hammer crusher, a roll crusher or a double roll crusher, and then classified in accordance with the particle size. Further, after the particles are finely pulverized by a roller mill or a tube ball, they are classified in accordance with the particle size.

Some or all of the classified fine particles or fine powder of the needle coke is subjected to coke shape changing treatment. In this shape changing treatment, various devices can be used as long as they can perform desired shape changing treatment. For the shape changing treatment, for example, a commercially available spheroidizing device can be used, of which an air flow type, a mechanical type, and a high-speed stirring type spheroidizing device are commercially available, and these can be arbitrarily selected.

Also, the measurement of the enveloping perimeter and the perimeter of the fine particles and the fine powder particles of the needle coke subjected to the shape changing treatment is performed using a shape image analysis device, a particle distribution image analysis device, or an image analysis particle size distribution meter that can measure the enveloping perimeter and the perimeter of the fine particles and the fine powder particles.

The present invention is characterized by increasing the ratio of the enveloping perimeter/the perimeter $(E_A/L_A)$ of the pulverized needle coke subjected to the coke shape changing treatment by 1% or more as compared with the value $(E_0/L_0)$ before performing the shape changing treatment as a reference. This makes it possible to significantly increase a bulk density (BD) of a molded product, and thus the bulk density after calcining or graphitizing. When the bulk density and the molding pressure are considered, it is desirable that the ratio be preferably increased by 3% or more, more preferably 5% or more.

Further, a shape changing rate (R) can also be represented by the following mathematical expression.

$$R = \frac{(E_A/L_A) - (E_0/L_0)}{(E_0/L_0)} \times 100 \qquad \text{[Math. 1]}$$

In a case in which the changing rate (R) before and after the changing treatment of the enveloping perimeter/perimeter has a difference of less than 1%, many needle-like forms derived from a crystal structure of the needle coke remain. Therefore, in the molded product obtained by combining the needle coke having a plurality of particle sizes, kneading it with the binder pitch, and performing extrusion molding thereof, voids generated due to the needle-like forms derived from the crystal structure of the needle coke remain, which causes cracks due to thermal shock.

The needle coke used is not particularly limited, and coal-based needle coke and petroleum-based needle coke can be used.

A true specific gravity of the needle coke is 2.120 to 2.170 g/cm³, preferably 2.125 to 2.165 g/cm³, and more preferably 2.130 to 2.160 g/cm³.

A CTE of the needle coke is 0.8 to $1.4 \times 10^{-6}/°$ C., preferably 0.85 to $1.3 \times 10^{-6}/°$ C., and more preferably 0.9 to $1.25 \times 10^{-6}/°$ C.

An apparent density of the needle coke is 2.090 to 2.140 g/cm³, preferably 2.110 to 2.135 g/cm³, and more preferably 2.125 to 2.130 g/cm³.

A nitrogen content in the needle coke is 0.60 wt % or less, preferably 0.55 wt %, and more preferably 0.45 wt % or less. A sulfur content in the needle coke is 0.60 wt % or less, preferably 0.45 wt % or less, and more preferably 0.30 wt % or less.

The binder pitch serving as a binder to be used preferably has a softening point of 70 to 150° C. and includes 15 to 30% of a β resin. If the softening point is lower than 70° C., it has a too low viscosity and is likely to enter into a deep portion of pores in the needle coke, and thus effects of the present invention become insufficient. If the softening point exceeds 150° C., a temperature of a kneader for kneading must be raised and the viscosity of the binder pitch must be forcibly lowered, and thus it is disadvantageous in terms of production efficiency. A more preferable softening point is 80 to 130° C.

For the binder pitch, the same kinds of binder pitch, for example, those having the same softening point may be used in at least two sub-divided kneading stages, and different kinds of binder pitch, for example, those having different softening points may be used in a first kneading stage and a second kneading stage. By changing the softening point, a diameter of the pores in the needle coke into which the binder pitch infiltrates and an amount of the infiltrating binder pitch can be adjusted.

Also, if necessary, impregnating pitch is impregnated after the calcining, secondary calcining is performed, and then the graphitizing is performed.

The needle coke is sieved and further pulverized, the binder pitch or the like is mixed thereinto, and kneading, molding, calcining, pitch impregnating, secondary calcining, and graphitizing at a high temperature of about 2500° C. is performed, and thus the artificial graphite electrode can be obtained. According to the manufacturing method of the present invention, a high-density artificial graphite electrode with few voids can be obtained without increasing the molding pressure.

EXAMPLES

Hereinafter, the present invention will be described in more detail with reference to Examples and Comparative examples, but the present invention is not limited to these Examples.

Examples 1 to 7

For the needle coke, coal-based needle coke having a true specific density of 2.15 and a pore volume of 0.136 cc/g measured by a mercury porosimeter was used.

This needle coke was pulverized with a jaw crusher, and after 8 to 16 mesh (Me') (2.38 to 1.0 mm) sieving, coke on and below the sieve was mixed and pulverized with a hammer crusher and sieved to 48 to 200 Me' (325 to 74 μm) and 200<Me' (74 μm or less).

Among these particle sizes, powder of 200 Me' or less was subjected to shape changing treatment using a high-speed stirring type powder spheroidizing device manufactured by Seishin Enterprise Co. Ltd. The shaping treatment was carried out under four conditions with the same coke blending ratio (Examples 1, 3, 4, and 5). Further, in Examples 2, 6 and 7, cokes having the same particle size that had not been subjected to the shape changing treatment was blended in, and the effect of the shape changing treatment was compared therebetween.

A degree of the shape changing treatment was measured using a particle shape image analysis device PITA-04 manufactured by Seishin Enterprise Co. Ltd. In order to show the degree of the shape changing treatment that had been performed, a shape changing rate (R), obtained by calculating the ratio of the enveloping perimeter/the perimeter ($E_A/L_A$) of 200<Me' after the shape changing treatment referenced to a ratio of an enveloping perimeter/a perimeter ($E_0/L_0$) of 200<Me' before the shape changing treatment, is shown in Table 1.

After the particle sizes were blended such that the particle size distribution became 40% (8 to 16 Me'), 35% (48 to 200 Me'), and 25% (200<Me') from the largest particle size, 100 parts of this needle coke was kneaded with 27 parts of the binder pitch (BP). The binder pitch used had a softening point of 97° C. and includes 20% of a β resin.

A molding pressure for the kneaded product in an extrusion molding machine was adjusted such that an extrusion speed thereof is constant at 7 cm/min for a size of 20 mmφ×100 mm, and the pressure at that time was defined as the molding pressure. An extruded product was calcined at 900° C. and then graphitized at 2500° C.

A bulk density (BD) was measured for each of the extruded products, the sample after the calcining at 900° C., and the sample after the graphitizing.

The results are shown in Table 2.

Comparative Example 1

A graphite electrode was manufactured in the same manner as in the examples except that surface changing treatment was not performed by a high-speed stirring type powder spheroidizing device. The results are also shown in Tables 1 and 2.

TABLE 1

|  | 8 to 16 Me' Untreated | 48 to 200 Me' Untreated | 200 < Me' | | | | |
|---|---|---|---|---|---|---|---|
|  |  |  | Untreated | Shape changing treated | $E_0/L_0$ | $E_A/L_A$ | R (%) |
| Compara example 1 | 40% | 35% | 25% |  | 0.866 |  | 1.0 |
| Example 1 | 40% | 35% |  | 25% |  | 0.955 | 10.3 |
| Example 2 | 40% | 35% | 12.5% | 12.5% |  | 0.911 | 5.1 |
| Example 3 | 40% | 35% |  | 25% |  | 0.951 | 9.8 |
| Example 4 | 40% | 35% |  | 25% |  | 0.971 | 12.1 |
| Example 5 | 40% | 35% |  | 25% |  | 0.959 | 10.7 |
| Example 6 | 40% | 35% | 17.5% | 7.5% |  | 0.894 | 3.2 |
| Example 7 | 40% | 35% | 22.5% | 2.5% |  | 0.875 | 1.1 |

(Remarks)
Values of $E_0/L_0$, $E_A/L_A$, and R indicate shape characteristics of coke 200 < Me'.

TABLE 2

| | $E_0/L_0$ | $E_A/L_A$ | R (%) | Pressure [MPa] | Molding BD [g/cm³] | Calcining BD [g/cm³] | Graphitizing BD [g/cm³] | CTE [× 10⁻⁶/° C.] |
|---|---|---|---|---|---|---|---|---|
| Compara example 1 | 0.866 | | 1.0 | 13.5 | 1.481 | 1.443 | 1.443 | 1.32 |
| Example 1 | | 0.955 | 10.3 | 8.9 | 1.537 | 1.495 | 1.495 | 1.26 |
| Example 2 | | 0.911 | 5.1 | 10.6 | 1.513 | 1.485 | 1.485 | 1.27 |
| Example 3 | | 0.951 | 9.8 | 9.2 | 1.538 | 1.502 | 1.502 | 1.26 |
| Example 4 | | 0.971 | 12.1 | 6.7 | 1.607 | 1.580 | 1.580 | 1.21 |
| Example 5 | | 0.959 | 10.7 | 7.6 | 1.562 | 1.529 | 1.529 | 1.29 |
| Example 6 | | 0.894 | 3.2 | 10.9 | 1.501 | 1.470 | 1.470 | 1.30 |
| Example 7 | | 0.875 | 1.1 | 12.1 | 1.488 | 1.455 | 1.455 | 1.31 |

INDUSTRIAL APPLICABILITY

According to the manufacturing method of the present invention, it becomes possible to lessen the voids as compared with the case in which needle coke having a plurality of particle sizes is sorted by classification in accordance with the particle size and then combined in order to lessen the causative voids with the purpose of preventing cracks in an artificial graphite electrode due to thermal shock accompanying an increase in diameter thereof. As a result, this manufacturing method can contribute to increasing the density of the artificial graphite electrode so that the pressure in the extrusion molding process can be reduced, and it can contribute to a great deal of energy saving. Accordingly, the artificial graphite electrode manufactured by the manufacturing method of the present invention can be suitably used for a large artificial graphite electrode corresponding to a large high-load electric furnace.

The invention claimed is:

1. A method for manufacturing a high-density artificial graphite electrode for electric steelmaking by pulverizing needle coke, kneading the pulverized needle coke with binder pitch, extrusion molding thereof, and then calcining and graphitizing thereof, the method comprising pulverizing needle coke, and then performing coke shape changing treatment for some or all of the pulverized needle coke, thereby increasing a ratio of an enveloping perimeter/a perimeter ($E_A/L_A$) of the needle coke after the shape changing treatment by 1% or more as compared with a value ($E_0/L_0$) before the shape changing treatment as a reference, wherein the enveloping perimeter is a length of a perimeter when apexes of convex portions of a particle of the needle coke are connected to each other via the shortest distance, and the perimeter is a length of a perimeter of the particle of the needle coke;
wherein the needle coke for which the shape changing treatment is performed is pulverized needle coke having a particle size of 500 μm or less as classified by sieving.

2. The method for manufacturing a high-density artificial graphite electrode for electric steelmaking according to claim 1, wherein the needle coke has a true specific gravity of 2.00 or more, a CTE of $1.30 \times 10^{-6}/°$ C. or less, a nitrogen content of 0.6 wt % or less, and a sulfur content of 0.6 wt % or less.

3. The method for manufacturing a high-density artificial graphite electrode for electric steelmaking according to claim 1, wherein the binder pitch has a softening point of 70°° C. to 150° C. and an amount of β resin of 15 to 30 wt %.

4. The method for manufacturing a high-density artificial graphite electrode for electric steelmaking according to claim 1, wherein the needle coke for which the shape changing treatment is performed is pulverized needle coke having a particle size of 75 μm or less as classified by sieving.

* * * * *